Figure 1A:
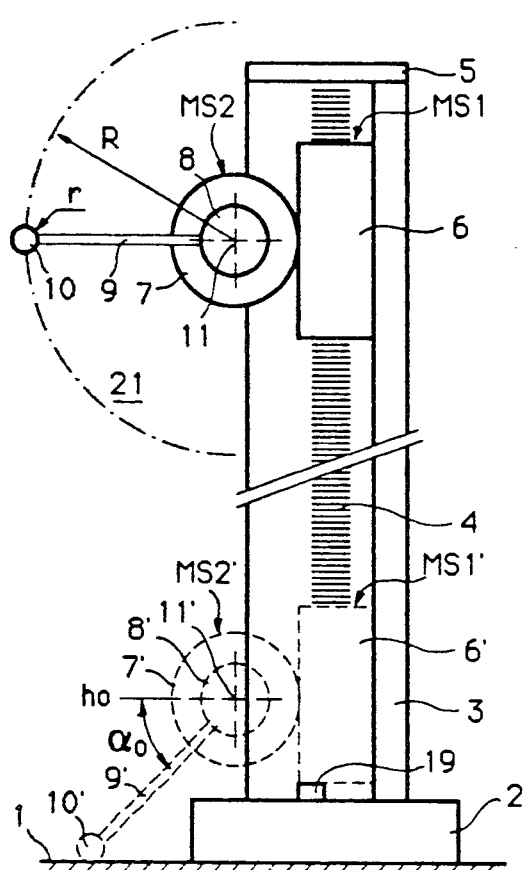

United States Patent [19]

Weber

[11] Patent Number: 5,131,166

[45] Date of Patent: Jul. 21, 1992

[54] VERTICAL/HORIZONTAL MEASURING APPARATUS AND PROCEDURE FOR ITS USE

[76] Inventor: Hans R. Weber, 10, chemin du Grillon, Lausanne CH-1007, Switzerland

[21] Appl. No.: 580,535

[22] Filed: Sep. 11, 1990

[30] Foreign Application Priority Data

Sep. 11, 1989 [CH] Switzerland .................. 03301/89

[51] Int. Cl.$^5$ ............................................. G01B 7/02
[52] U.S. Cl. ................................... 33/832; 33/1 M; 33/558; 33/503
[58] Field of Search ............... 33/1 M, 832, 838, 551, 33/556, 558, 559, 561, 501.6, 553, 554, 503, 504, 505, 501.9, 501.14

[56] References Cited

U.S. PATENT DOCUMENTS

| | | | |
|---|---|---|---|
| 3,750,295 | 8/1973 | Nordmann et al. | 33/503 X |
| 4,166,323 | 9/1979 | Maag | 33/551 X |
| 4,766,674 | 8/1988 | Zanier et al. | 33/558 X |
| 4,888,877 | 12/1989 | Enderle et al. | 33/561 X |

Primary Examiner—Harry N. Haroian
Attorney, Agent, or Firm—Sherman and Shalloway

[57] ABSTRACT

A measuring apparatus is proposed which offers significantly more measuring possibilities compared with conventional apparatus. In particular, in addition to measurements in the Z axis it allows measurements in the horizontal plane, the measurement of inclined prismatic bodies, the determination of angles of inclination and the definition of bores and cylinders through three or more points. The combined action of two measuring systems (MS1, MS2) allows the mass to be moved during measurement as well as the necessary contact pressure of the measuring probe (10) to be significantly reduced, thus rendering the measuring apparatus suitable for automatic measuring cycles. A carriage (6) is positioned so as to be movable advantageously by means of a magnet bearing on a column (3) advantageously made of ceramic material and the displacement measured by a measuring system (MS1). The displacement of the measuring probe (10) in relation to the carriage (6) is measured by at least a second measuring system (MS2). The signals of both as well as any further measuring systems are fed into a computer (26) which evaluates them according to pre-determined criteria individually or dependent on one another. The measuring apparatus and/or the computer (26) can be connected via a standard interface with a freely programmable computer (28) or periphery equipment.

27 Claims, 4 Drawing Sheets

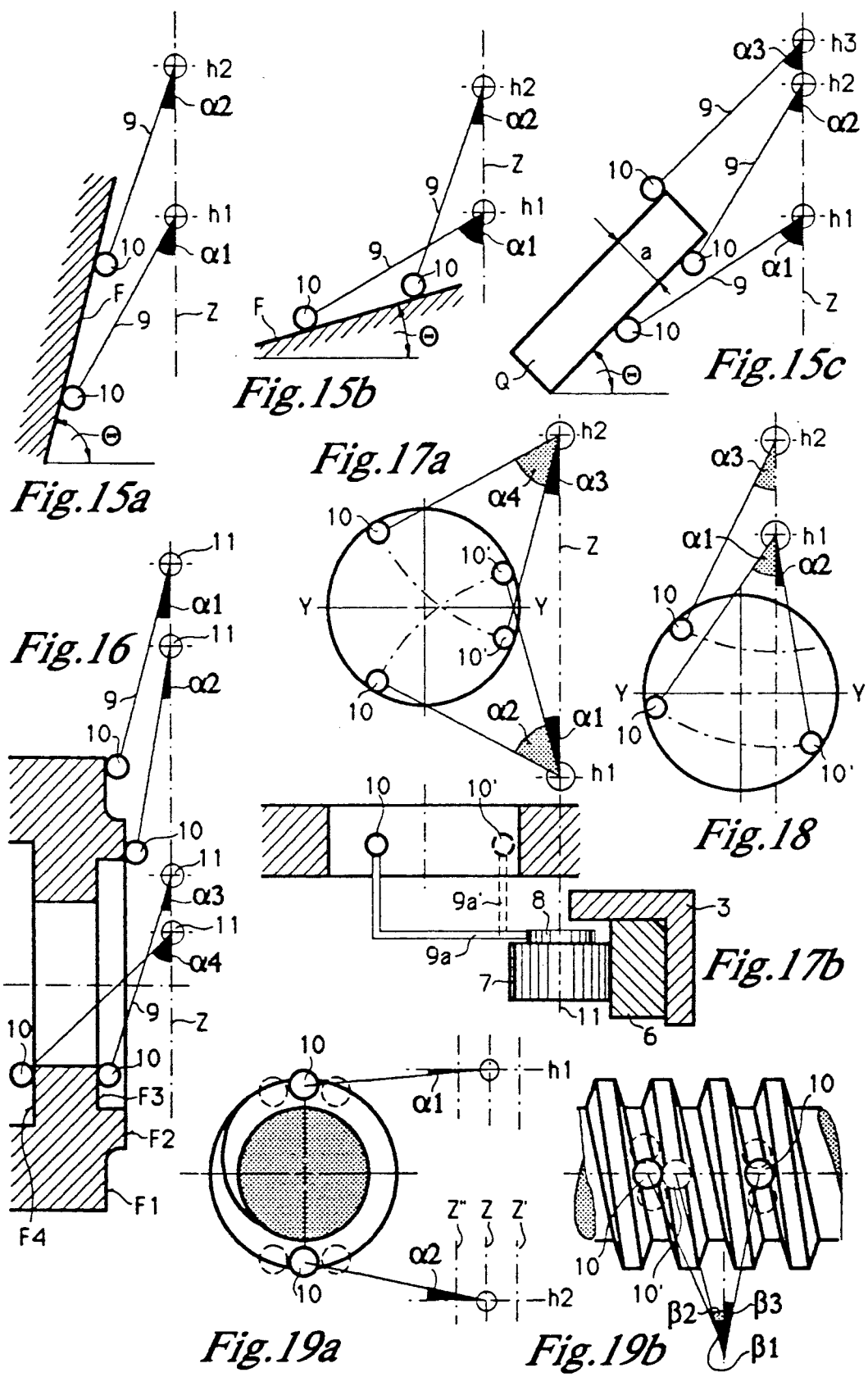

VERTICAL/HORIZONTAL MEASURING APPARATUS AND PROCEDURE FOR ITS USE

The invention relates to a vertical/horizontal measuring apparatus and to a procedure for its use.

Height measuring apparatus of the kind known today are intended for the measurement of vertical distances between bores, shafts, surfaces, vertical diameters of bores and shafts, vertical deviations of position, straightness, center-to-center distances, highest and lowest points of workpieces or generally to determine the coordinate values of points on the Z axis. If the workpiece is turned through 90° and the same parts measured again it is also possible to take measurements on a vertical plane X;Y in relation to the workpiece, and after appropriate calculations to represent the measuring points in cartesian or polar coordinates.

Height measuring apparatus consist essentially of a vertical column which can be freely moved manually on a horizontal plane and which is provided with a scale as the material measure as well as a linear guide, along which a carriage is freely movable in a vertical direction. A measuring system which acts together with the scale and a probe for scanning the workpiece are coupled directly or indirectly to the carriage.

In a first known practical embodiment of this type of height measuring apparatus the measuring probe, measuring system and the carriage ar connected in a rigid manner. In order to facilitate free positioning of the carriage, it is balanced with a counterweight, thus doubling the movable mass of the carriage. In order to perform a measurement, the masses of the carriage and the counterweight must be accelerated in the direction of the point to be measured and then retarded. The probe on this known measuring apparatus is attached to a rod extending from the carriage, which is subject to bending strain by the measuring force and must therefore be of fairly sturdy dimensions. In order to achieve a reasonable rate of repeatability of the measuring results, the measuring force must be at least a multiple of the total frictional forces of the carriage on its vertical guide. Guide errors, multiplied by a factor depending on the distance of the measuring probe from the guide, are reproduced in the measuring result since the apparatus does not measure according to the Abbe principle, i.e. the measuring point is not in the axis of the guide.

In an improved second practical embodiment of a known height measuring apparatus in accordance with CH-A 668 123, the measuring probe with its linkage and the measuring system are designed as an independent assembly with an additional guide and an additional counterweight and are connected with the carriage so as to be rotatable at their center of gravity. This allows the mass which is moved towards the measuring point to be reduced to the mass of the assembly, however this is not sufficient to allow the probe to be set down on a high-precision workpiece in a problem-free manner and without using the greatest of care. The remaining friction does not allow the measuring force to be reduced to a value which is necessary for measuring relatively soft materials such as plastics.

In an also known third practical embodiment of a height measuring apparatus, so-called dynamic approach scanning of the measuring point is utilized. The probe and its linkage are combined in a single assembly which can move within certain boundaries in a vertical direction relative to the carriage and its measuring system. When a pre-determined boundary mark is overreached, the measuring result obtained at that moment is blocked and displayed. This method places high demands on the reaction time of the measuring system if it is to operate in a truly dynamic manner. However, the dynamic nature of the apparatus is here also hampered by the still large masses of the probe, the rod and their guides, so that this method can best be described as quasi static and here also extremely careful approach scanning of the measuring point is the prerequisite for exact measurement. This known height measuring apparatus uses an independent linear transducer linked to a display apparatus to determine the highest and lowest points.

Further known practical embodiments of height measuring apparatus use a lever feeler, similar to a lever gauge, as a probe, which emits a signal when passed over the measuring point for recording and display of the measured value.

Measuring devices are also known which translate small Travels in any direction into a travel in the direction of their longitudinal axis which they then measure.

If an additional longitudinal measuring device is used with the measuring direction perpendicular to that of the height measuring apparatus, the straightness and parallelism of essentially vertical lines can be determined.

When diameters of bores or cylinders are measured it is important that their diameters be determined and not a chord. For this purpose the measuring probe is conventionally slid horizontally together with the height measuring apparatus, often weighing over 20 kg, along the surface on which it is resting until the measuring probe has passed through the highest or lowest point of the bore or cylinder and their measured values have been recorded electronically. This undertaking is particularly problematic when small bores with diameters only slightly larger than those of the measuring probe are measured. In these cases there is a danger that after the entire mass of the height measuring apparatus has been accelerated in one direction, the measuring probe strikes the opposite bore wall and the linkage or the guide are permanently deformed, or the workpiece is damaged, or the zero point is knocked out of adjustment so that afterwards faulty measurements are made. The danger is greatest when for any reason the air cushion on which the height measuring machine as a whole floats during displacement does not function properly, or when the nature of the horizontal reference surface preclude use of an air cushion.

Further problematic aspects, operational and structural details and the design of the electronics and software of these known height measuring apparatus are not discussed here as these points are not relevant to the present invention while also being sufficiently familiar to experts.

Taking as a starting point the above-described disadvantages of known height measuring apparatus, the task of the present invention is on the one hand to design a vertical/horizontal measuring apparatus which offers all of the measuring features of conventional height measuring apparatus while the assembly connected with the measuring probe which is moved towards the measuring point has a minimum mass, in such a way that the measuring probe can rest on a measuring point with a force which can be almost limitlessly small. Additionally, the carriage should be guided more precisely than is usual and the movable mass connected with it should be smaller than is the case with known height measuring apparatus. The vertical/horizontal measuring apparatus in accordance with the invention should also open up new measuring possibilities in addition to those available today, in particular it should allow measurements on a horizontal plane, measurement of inclined prismatic bodies, determination of angles of gradient (slope) as well as the definition of bores and cylinders through three or more points. A further task of the present invention is to describe a procedure for the operation of a vertical/horizontal measuring apparatus in accordance with the invention.

This task is solved in accordance with the invention on the one hand by a vertical/horizontal measuring apparatus as described herein and on the other hand by the procedures for using the apparatus as described herein.

The new characteristics and design solutions of the vertical/horizontal measuring apparatus, considered singly or in concert, as well as further aspects which will be described in the following, make the device predestined for automation and thus for the creation of a vertical/horizontal measuring robot. The modular construction of the vertical/horizontal measuring apparatus in accordance with the invention allows easier adaptation to various user requirements than is the case with conventional height measuring apparatus, and certain modules can also be used on other measuring machines.

The measuring apparatus of interest here are such that a vertical column is fitted perpendicularly onto a horizontal base plate, preferably provided with means to produce an air cushion for easy displacement on a horizontal reference plane. Parallel to the column is an incrementally or absolutely coded scale as a material measure, which is scanned optically, capacitively, inductively, magnetically or otherwise. It is also possible to use a laser beam in conjunction with an interferometer as a material measure. The column contains or is itself essentially an exactly linear guide which must meet high requirement relating to straightness and flexural stiffness.

Since during certain types of operation of the vertical/horizontal measuring apparatus in accordance with the invention the apparatus must be brought towards the workpiece to be measured, i.e. accelerated and decelerated again over a short distance, it is important to keep the total mass of the apparatus as small as possible. Thus it is important to select a material and a section for the column which result in the best possible relation of weight and flexural stiffness and which allow exact guidance of the carriage. Of the materials currently available, the most suitable are ceramic materials such as aluminium oxide, silicon carbide, silicon nitride, zirconium oxide, titanium diboride, boron carbide, aluminium nitride, whisker-reinforced oxides, as well as other ceramic materials, some of which are available under brand names. With these materials the ratio of modulus of elasticity to specific weight is greater than that of structural steel by at least a factor of three. Ceramic materials are also ideal for guide functions since they can be milled, ground and lapped to a fine precision and are non hygroscopic, resistant to corrosion, resistant to friction and preserve their dimensions over time. Their coefficient of linear thermal expansion is lower than that of steel. This circumstance can be allowed for by structural measures known to experts.

An innovative bearing has the advantage that only two surfaces must be lapped smooth. No requirements are made for parallelism and dimensional accuracy of the distances between surfaces, which are difficult to achieve with ceramic materials. With the exception of the two runways and their one longitudinal boundary, all other surfaces can be left rough or unmachined.

The material measure can advantageously be integrated directly on the column in such a way that at least one part of the ceramic column forms the substrate. In the case of a scale for capacitive reading it is expedient to apply an electrically conducting coating to this substrate which is subsequently etched or engraved. It is also possible to coat the substrate selectively with the pattern of the scale so that etching or engraving are unnecessary. At the same time conductive zones can be applied for optimal electrostatic screening. The ceramic substrate has the advantage that, apart from the above mentioned mechanical properties, it also has favourable dielectric properties and the character of its surface makes it particularly suitable for coating with conductive layers. In this way more exact and stable material measures can be achieved than is the case with the materials in use today. Integration of the material measure in the longitudinal guide has a positive effect on the price of the apparatus, since the scale is not an additional component which must be manufactured and mounted.

In view of the fact that with this kind of measuring apparatus the measuring probe cannot be placed in the axis of the guide, but must always be at a distance from it—in certain circumstances a considerable distance—and that guide and wobble faults from roller bearings can distort the measurement result, the quality of the guide must be of the highest order. For this reason it is expedient to use a sliding guide for the carriage. Known sliding guides, combined with air cushions and vacuums, provide good sliding conditions, rigidity and adhesion, but require constant underpressure and therefore energy for adhesion. With the aim of keeping the mass of the carriage as low as possible and of consuming no energy, at least when the carriage is stationary, a magnet bearing can be used advantageously which utilizes the excellent properties, in particular the high density of energy $(BH)_{max}$, of modern permanent magnet materials such as cobalt rare earth, samarium cobalt, neodymium iron boron and other magnets available from various manufacturers under the brand names Vacodym, Vacomax, Recoma, Refema and others. Rails made of soft iron run parallel to the guide surfaces of the column, forming part of a magnetic circuit. The high energy magnets, together with optimal direction of the lines of flux result on the one hand in perfect contact pressure of the carriage onto the guide surfaces arranged at an angle to one another, and on the other hand in a resistance to displacement corresponding to the total force of the magnets multiplied by the coefficient of friction between carriage and guide.

The friction surfaces can, for example, be provided with PTFE or ceramic material in order to reduce the coefficient of friction.

During displacement of the carriage, static air pressure can build up which acts against the magnetic force, so that the displacement force can be reduced or if required brought down to practically zero. The contact pressure can be adjusted over a wide range by altering the magnetic resistance, most easily the length of the air gap.

As already mentioned, it is important that the measuring probe and the measuring apparatus components operatively connected with it are burdened with a minimum of mass in order to be able to carry out rapid unproblematical and exact measurement.

A significant reduction of the mass of the measuring apparatus components accelerated towards the measuring point is achieved in accordance with the invention by the use of two separate measuring systems, one of which measures the linear displacement of the carriage on the column and the other the displacement of the measuring probe in relation to the carriage. By addition of the measured value of the displacement of the carriage on the column and the value of the displacement of the measuring probe in relation to the carriage, the position of the measuring probe can be indicated.

The measuring system operationally connected with the measuring probe must be mounted in a manner free from play and easily movable. It can be provided with low-friction longitudinal guides with which the expert will be familiar, or consist of a linear measuring device which already contains the guide. Transducers can also be used which can be deflected in several degrees of freedom and which contain several measuring systems, advantageously arranged square to one another.

All requirements made of a measuring device, here consisting essentially of measuring probe, shaft, measuring system and its bearing, with regard to low mass, low friction, freedom from play and exactness are fulfilled in accordance with the invention for example by the use of an element which is new in this application, i.e. a rotary encoder.

The rotary encoder is operatively connected with the carriage so that the height coordinate of its initially horizontal axis is known exactly. An essentially spherical or spherical segment-shaped measuring probe is connected with the axis of the rotary encoder via a lever arm of known length.

A calibrated position of the vertical/horizontal measuring apparatus, whereby the angle of rotation and the axis height of the rotary encoder can be mechanically set in an easily repeatable manner, corresponds to a set of appropriate calibration coordinates. On the basis of these calibration coordinates, the axis height and angle of rotation can then be measured, the lever arm can be multiplied with the corresponding trigonometric function of the angle of rotation and, taking into account the probe constant and the direction of approach for scanning, as a result the height coordinates of the approached measuring point can be displayed and/or recorded. The probe constant is defined by the measured value of the vertical displacement after the measuring probe is guided to a horizontal surface of constant height, once from above and once from below. It results essentially from the diameter of the measuring probe and the bending of the measuring linkage under the influence of measuring force and weight. It is an additive constant, however for the rotary encoder it can also include a component dependent on angle and direction. It is preferably determined experimentally and stored in the computer connected to the vertical height measuring apparatus in accordance with the invention. In this way any possible linearity faults of the rotary encoder can be corrected.

When a rotary encoder is used the sensitivity of the measurement is inversely proportional and the measuring range proportional to the lever arm. This means that in order to measure larger distances where a lower resolution is necessary, a measuring probe with a longer lever arm is used and a correspondingly larger measuring range can be covered. The length of the lever is advantageously either input into the computer as a constant or determined experimentally and stored. By means of coding, various lever arm lengths can be determined automatically.

In order to measure points on a workpiece which are difficult to reach, a measuring head can be used to advantage in accordance with the invention, with the lever arm carrying the probe not attached directly to the axis of the rotary encoder, but to its own axis at a pre-determined distance to that of the rotary encoder. The rotating movement of the probe is transferred mechanically to the rotary encoder at a pre-determined ratio. The inclination of the measuring head can be adjusted, increasing the measuring range of the apparatus.

In addition to the applications of a height measuring apparatus in accordance with the current state of technology, the measuring apparatus in accordance with the invention offers the further possibility of measuring horizontal distances as described in the following.

The axis of the rotary encoder is initially in a horizontal position. After the computer has been switched over from vertical to horizontal measurement, the polar coordinate system of the rotary encoder is rotated mathematically through 90° so that as the angle of rotation of initial position and final position the complementary angles of 90° are taken into account. The height coordinates of the carriage and the polar coordinates provided by the rotary encoder respectively their horizontal components are then displayed and recorded separately. The horizontal measuring range is limited in accordance with the limited angular movement in this configuration, however it is entirely sufficient for many measurements. The parallelism and straightness in relation to the axis of the column of an essentially vertical line can also be determined with this configuration.

By turning the measuring system connected with the measuring probe through 90°, its entire measuring area in the horizontal plane is utilized. Thus horizontal distances bordered by parallel vertical surfaces can be measured. Measurement of diameters of shafts and bores with vertical axes where maximum and minimum values must be recorded requires horizontal displacement along a straight line. This can be achieved by sliding the measuring apparatus along a rule or by mounting it on a horizontal longitudinal guide. This guide must be free of play and straight because guiding errors influence the measuring result. If the horizontal guide is provided with an additional measuring system which operates alone or in combination with the measuring system with the measuring probe, new measuring possibilities are made available and in particular the measuring range in the horizontal plane is increased.

Due to the fact that no counterweight is used and that the guide and drive of the carriage function in a vertical as well as a horizontal position and in all intermediate positions, the column together with its base can be tilted by 90°. For this purpose supports are provided which hold the column parallel to the horizontal reference surface. It is also conceivable that the column be designed to be tiltable around its now horizontal axis in order to facilitate or make possible insertion of the probe into recesses. A typical application example for this kind of design is the measurement of distances on a horizontal shaft.

If the measuring system with the measuring probe is now rotated through 90° so that its measuring plane is active in a vertical direction, vertical distances within the measuring area of the above-mentioned measuring system can be defined. If probes are used with at least two degrees of freedom and the corresponding measuring ranges, horizontal and vertical distances can be defined without turning the measuring head. The measuring apparatus can be freely movable on its horizontal reference area, if necessary by means of air suspension, or it can be fixed in relation to a workpiece or a workpiece holding fixture. Naturally, in connection with linear measuring systems the usual measuring inserts such as edges, surfaces, cones, points etc. can be used.

A magnet bearing, which on the one hand provides good adhesion in the stationary position and on the other hand requires a low displacement force in the movement phase, allows motor-driven displacement of the carriage along its guide at a small expenditure of energy. This is important because height measuring apparatus are mostly covered by accumulators. With the column in the vertical position the drive must overcome not only the displacement force but also the weight of the carriage and must be of corresponding capacity. The term "motorized drive" comprises electrical, pneumatic and hydraulic elements and rotary and translatory, position, speed and program controlled methods and combinations of these.

In order to ensure a high measuring convenience it is advantageous to automate the sequence of movement of the measuring probe. Since very small masses are moved, this is possible with a small expenditure of energy and at high speed. In the case of a rotary encoder motorized drive elements can be used to move to predetermined positions and to produce a constant moment of rotation. In order to produce a constant measuring force, advantageously square to the tangent at the contact point of the measuring probe, it may be expedient to adjust the moment of rotation to the gradient. The control element can be fitted on the axis of the rotary encoder or be an integrated part of it. Capacitive and optical measuring systems are perfectly compatible with control elements on an electromagnetic or electrodynamic basis.

With the aid of the following description, which refers to the enclosed drawings, advantageous practical embodiments of the vertical/horizontal measuring apparatus in accordance with the invention and certain applications of it are explained. It should be noted that the drawings reproduce schematic and basic representations of these practical embodiments without taking account of certain necessary details which will be familiar to the expert.

Figure 2A:
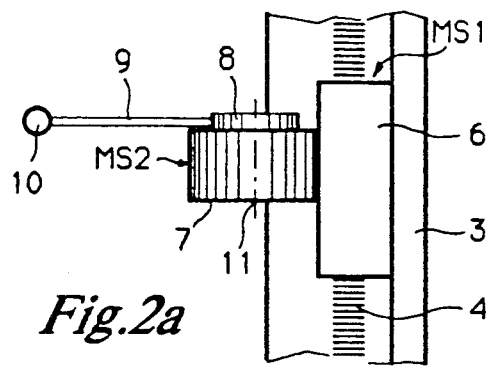
Figure 2B:
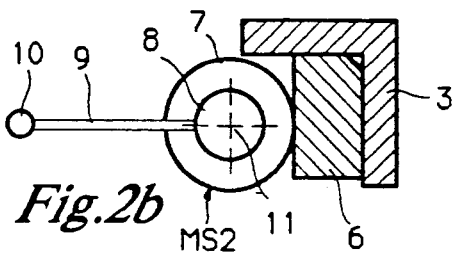
Figure 4:
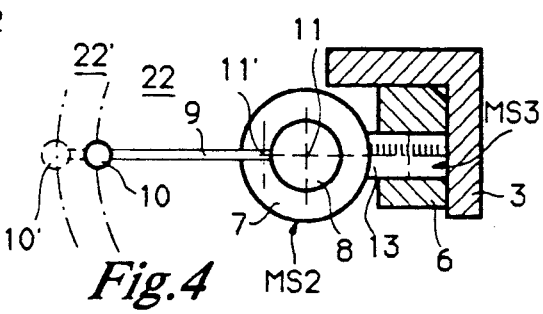
Figure 1B:
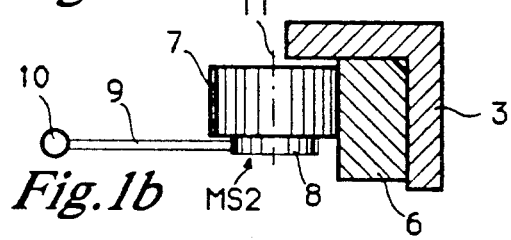
Figure 3:
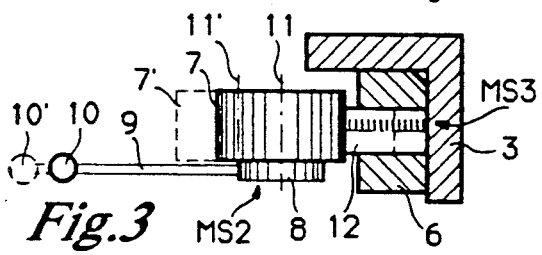
Figure 6:
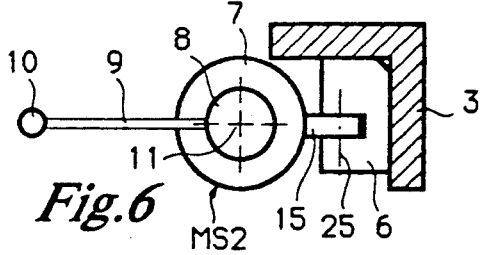
Figure 5:
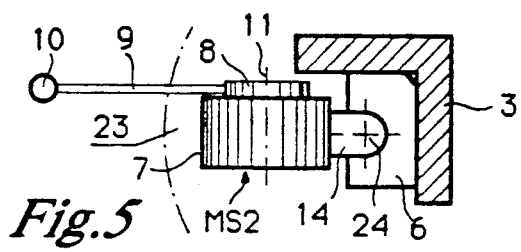
Figure 7:
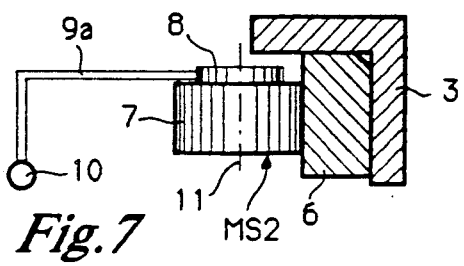
Figure 8A:
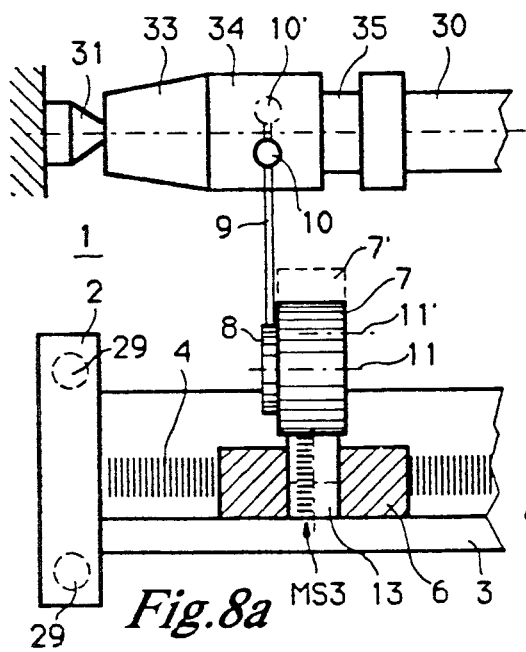
Figure 8B:
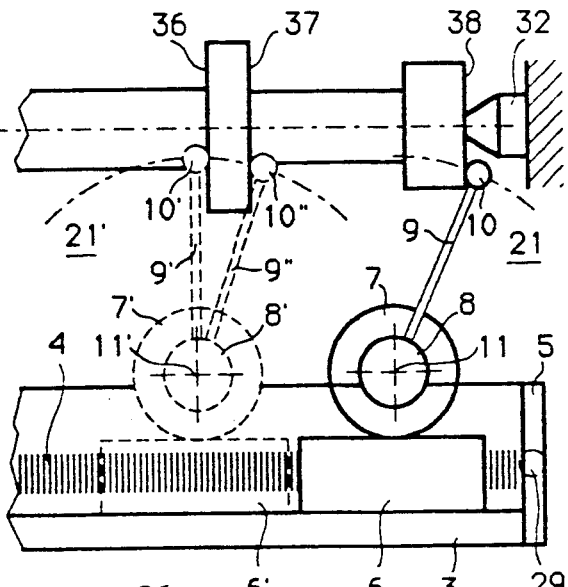
Figure 9A:
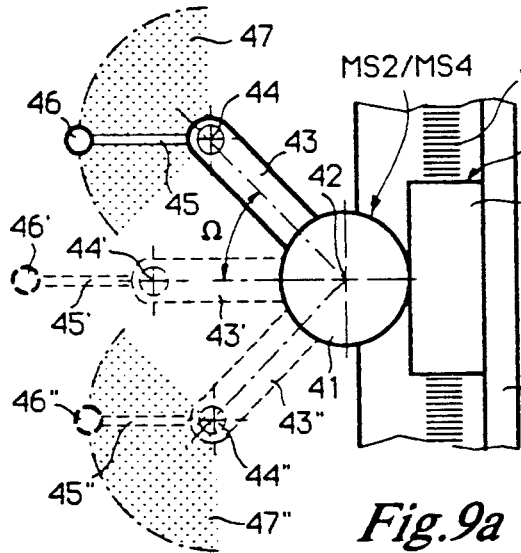
Figure 9B:
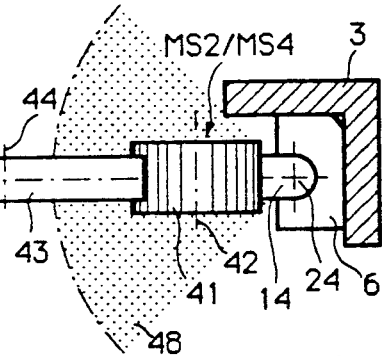
Figure 9C:
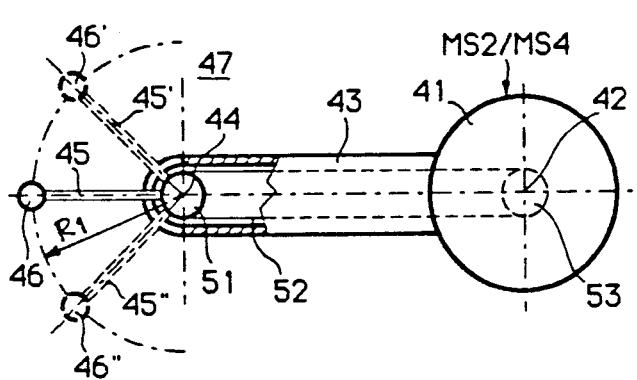
Figure 10:
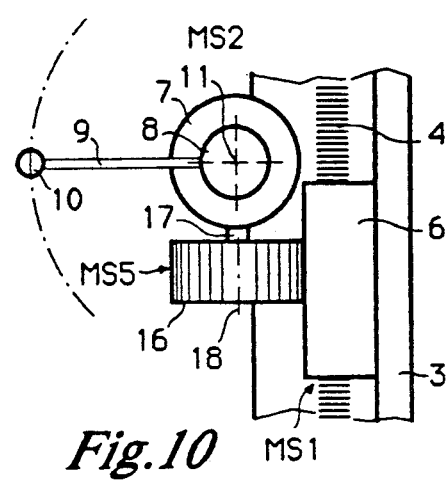
Figure 11A:
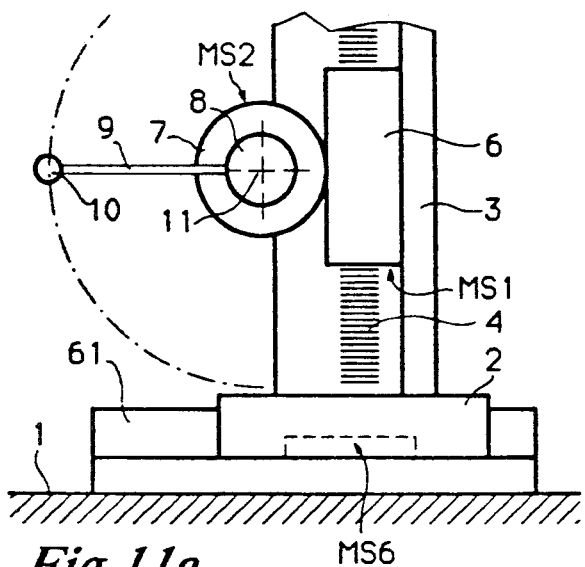
Figure 12A:
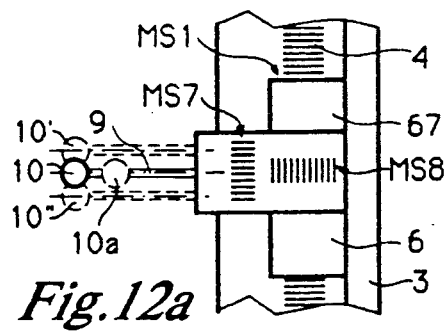
Figure 12B:
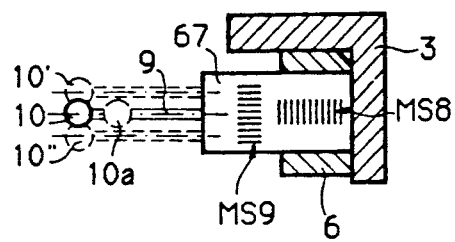
Figure 11B:
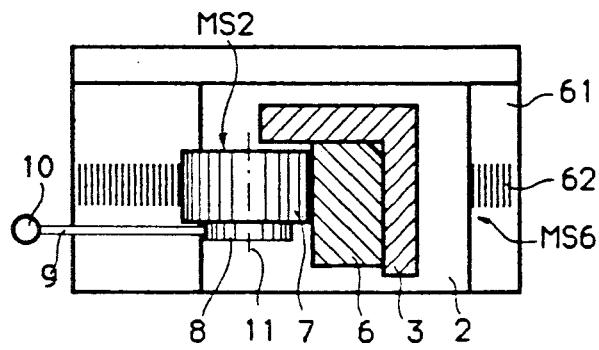
Figure 12C:
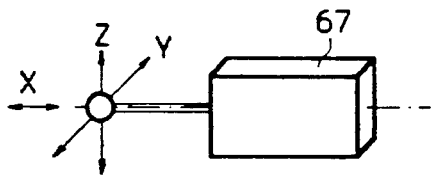
Figure 13:
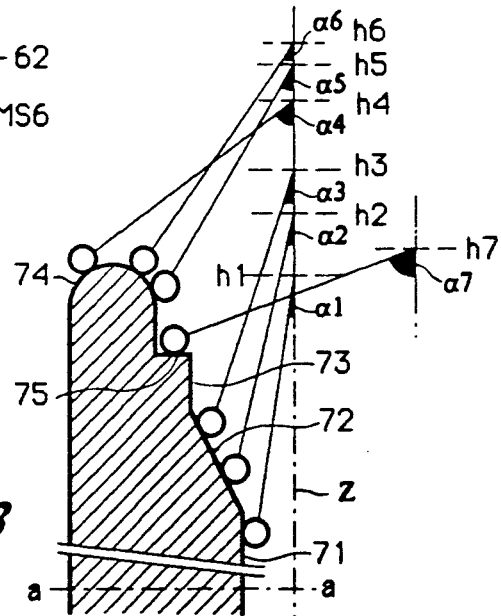
Figure 14:
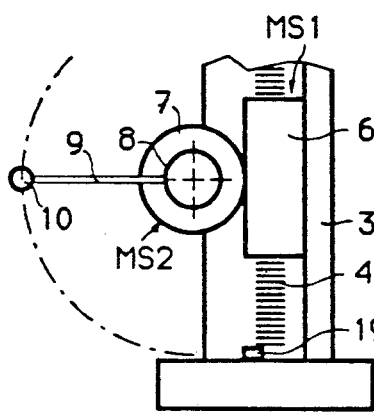
Figure 14:
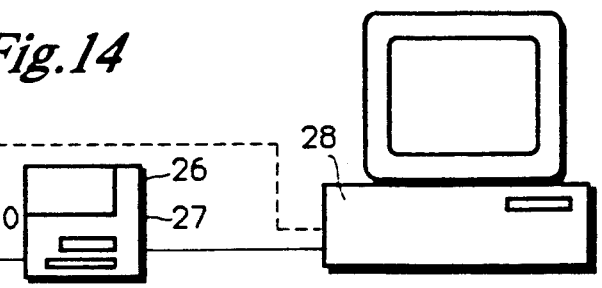

FIG. 1a shows a side view of an advantageous first practical embodiment of the invention with a rotative measuring system with horizontal rotational axis on a vertically movable carriage in two measuring positions, FIG. 1b shows the vertical/horizontal measuring apparatus in accordance with FIG. 1a in partial section from above, FIGS. 2a and 2b show a part of the column of the vertical/horizontal measuring apparatus in accordance with the invention and with with FIGS. 1a and 1b, whereby the rotational axis of the rotative measuring system is parallel to the vertically movable carriage, viewed from the side and in a partial section from above, FIGS. 3 and 4 show an extended second practical embodiment of the measuring apparatus in accordance with FIGS. 1 and 2, whereby the rotative measuring system is movable in a linear manner in a plane which is perpendicular to the direction of displacement of the carriage on the column, FIGS. 5 and 6 illustrate an extended third practical embodiment of the invention where the measuring system can pivot about a pivoting axis with a vertical as well as a horizontal rotational axis, FIG. 7 shows a vertical/horizontal measuring apparatus in accordance with the invention and with any of the preceding practical embodiments with an angular measuring device, FIG. 8a shows a possible application of a vertical/horizontal measuring apparatus in accordance with the invention and with FIGS. 3 and 4, FIG. 8b shows a possible application of a vertical/horizontal measuring apparatus in accordance with the invention and with any of the preceding figures, FIGS. 9a, 9b and 9c show a special practical embodiment of a rotative measuring system such as may be utilized in any of the previously mentioned practical embodiments of the measuring apparatus in accordance with the invention, FIG. 10 shows a further developed fourth practical embodiment of the invention with two rotative measuring systems with their rotational axes at right angles to one another, FIGS. 11a and 11b show a structural development which can be used with any of the above described practical embodiments of a vertical /horizontal measuring apparatus in accordance with the invention, FIGS. 12a, 12b and 12c show part of a fifth practical embodiment of the invention with a linear measuring system fitted on the carriage, FIG. 13 shows measurement of the profile of a workpiece in a schematic diagram, FIG. 14 represents a measuring apparatus, e.g. in accordance with FIG. 1, together with its asociated service block, which is connected to a computer, FIGS. 15a, 15b and 15c show further possible applications of the vertical/horizontal measuring apparatus in accordance with the invention with a rotary encoder for determining the angle of inclination of surfaces of workpieces as well as the distances between them, FIG. 16 shows how horizontal distances of vertical surfaces on a workpiece can be measured, FIGS. 17a and 17b show the determination of bore diameters as well as the position of their center points or center axes using a measuring apparatus in accordance with FIG. 7, FIG. 18 shows another variation of the determination of bore diameters and their center lines with the aid of three measuring points, and FIGS. 19a and 19b show the use of a vertical/horizontal measuring apparatus in accordance with the invention for measuring a thread.

In FIG. 1 a reference plane 1 can be seen. A base plate 2 with a vertical column 3 is placed on this so as to be movable. An incremental or absolutely coded scale 4 runs parallel to the column 3 as a material measure, which can be scanned by a reading device connected with a carriage 6 and which forms a first measuring system MS1. The column 3 is advantageously bounded at the top by means of a stop plate 5 and contains or is essentially an exact linear guide for the carriage 6 which holds a second measuring system MS2. The measuring system MS2 consists of a rotary encoder 7, a shaft end 8 with an axis 11, a shank 9 and a measuring probe 10.

The carriage 6 can be moved along the entire length of the column 3, whereby the lowest position represented in FIG. 1a by dotted lines can serve as the calibration or zero position of the apparatus in the Z axis. When the carriage 6' rests on a stop gauge 19, the height coordinate $h_o$ of the axis 11' of the rotary encoder 7' is mechanically exactly defined. When the measuring probe 10' rests on the horizontal reference plane 1, the angle $\alpha_0$ between its center radius R and/or the shank 9' and for instance the horizontal plane is also mechanically exactly defined. The corresponding electronic values, which are advantageously stored in the computer 26, can now be collated to these mechanically defined starting positions of the two measuring systems MS1 and MS2. It is also possible to hold the center of the probe exactly at the level $h_o$ by means of a setting gauge not shown here, so that the angle $_0$ is zero. Other angles can also be defined as the calibration position. It is also possible to take over the calibration value when a calibration mark on the measuring systems MS1 and MS2 is passed over. Automatic takeover of a measured value can be triggered as soon as the sum of the measured values of the measuring systems MS1 and MS2 is constant within a pre-determined tolerance or over a pre-determined length of time, although the individual values of both measuring systems may continue to change or when the measured value changes of both systems are of equal size with opposite signs. This allows extremely rapid dynamic approach for scanning of the measuring points.

FIG. 1b illustrates an advantageous cross section of the column 3 in an L-shape and shows the arrangement of the rotary encoder 7 with its shank 9 and the measuring probe 10 connected with it on the carriage 6. In this view a measuring plane 21 is provided in a vertical position in relation to the page, on which the measuring probe 10 can approach measuring points.

From FIGS. 1a and 1b the expert will recognise that each height coordinate of the rotational axis 11 of the rotary encoder 7, e.g. in relation to the horizontal reference plane 1, is known because of the values determined by the first measuring system MS1. The measuring probe 10 is at least in the measuring plane 21 circular- or spherical-shaped in order to be able to scan a measuring point regardless of the angle of the shank 9. The height of the measuring probe 10 in relation to the rotational axis 11, which is dependent on the trigonometric function of the angle of rotation, is determined by the second measuring system MS2. Thus an unequivocal Z-value of the measuring probe 10 can be determined from a vertical position of the carriage 6 and an angular position of the rotary encoder 7.

It is apparent from FIGS. 2a and 2b that with the vertical/horizontal measuring apparatus in accordance with the invention, by swivelling the rotary encoder 7 together with the second measuring system MS2 in such a manner that its rotational axis 11 is parallel to the direction of movement of the carriage 6, points arranged on a measuring plane 21 defined by the Z position of the carriage 6 and the shank 9 and at right angles to the direction of movement of the carriage 6 can be measured. Here, the Z position of the plane to be scanned by the measuring probe 10 is defined by moving the carriage 6. When the measuring apparatus is used with the rotational axis 11 of the rotary encoder 7 in a vertical position, the two measuring systems MS1 and MS2 must be treated separately by the computer.

In FIGS. 3 and 4 a second practical embodiment of the vertical/horizontal measuring apparatus in accordance with the invention, offering additional measuring possibilities, is shown in each case in partial section from above. In this embodiment the rotary encoder 7 can be moved in a linear manner at right angles to the direction of movement of the carriage 6 by means of a linear guide 12, 13. In this way, if the rotary encoder 7 is in such a position that its rotational axis 11 is horizontal, the highest and lowest measures of e.g. horizontally arranged circular objects and thereby their diameters can be determined. FIG. 8a illustrates this in more detail. If the linear guide 12, 13 is designed as a third measuring system MS3, for instance in the form of a linear displacement transducer, additional distances of measuring points from the column 3 can be measured.

In FIGS. 5 and 6, a further-developed third practical embodiment of a vertical/horizontal measuring apparatus in accordance with the invention is represented from above in partial section. The rotary encoder 7 is movable by means of a joint 14, 15 around an axis 24, 25. The axis 24, 25 is advantageously arranged at right angles to the axis 11 of the rotary encoder 7.

Depending on the shape of the workpiece and the position of the points to be measured on it, it may be expedient to use a correspondingly-shaped shank 9a, e.g. an angled shank as shown in FIG. 7, instead of the straight shank 9. This is of course possible with all practical embodiments of the vertical/horizontal measuring apparatus in accordance with the invention.

FIG. 8 shows an application with the measuring apparatus in accordance with the invention in a horizontal position. As an example, both the diameter and the longitudinal distances are determined on a shaft 30 held horizontally between turning centers 31 and 32. For this purpose the column 3 is placed on support points 29 so that its axis is parallel to the horizontal reference plane 1. In FIG. 8a for instance, a cone 33, a cylindrical part 34 and a recess 35 are measured. For these measurements the rotational axis 11 of the rotary encoder 7 is in a horizontal position and its measuring plane 21 is vertical to the direction of movement of the carriage 6. In order to determine the diameter it is necessary to define the highest and lowest points of the generated surface, which is achieved by moving the measuring probe 10. In order to avoid having to displace the entire mass of the measuring apparatus to pass over the highest and lowest points, a linear guide 13 is arranged between the rotary encoder 7 and the carriage 6 which allows displacement of the rotary encoder 7 together with measuring probe 10 along a straight line. For calculation of the angle of the cone, two radius measurements at a known longitudinal distance from one another are required. The longitudinal distance is determined by the displacement of the carriage 6. In FIG. 8b for instance, starting at a front end 38 of the shaft 30 the longitudinal distances to a left-hand flank 36 and to a right-hand flank 37 are measured. For this purpose the rotary encoder 7 attached to the carriage 6 is turned in such a way that its rotational axis 11 is in a vertical position and its measuring plane 21 is horizontal. The longitudinal distances ca be calculated from the displacement of the carriage 6 and the angle information of the rotary encoder 7, taking into account specified constants and the direction of approach for scanning. In a practical embodiment not illustrated here it may be expedient to design or arrange the column 3 to be pivotable about its axis. It is also possible to fit several carriages and measuring systems onto the column 3. Several columns with various measuring configurations can be utilized for the solution of a complex measuring task.

FIG. 9a shows part of the column 3 with scale 4 and carriage 6 with an operatively connected measuring head which can advantageously be used to measure points which are difficult to reach. FIG. 9c shows a measuring probe 46 fixed to a shank 45 capable of rotation around an axis 44 in a radius $R_1$. A cylinder 51 is connected to the shank 45 and is rotatable around the same axis 44. An arm 43 contains at one end the bearing for the axis 44. Its other end is connected rigidly with the housing of a rotary encoder 41. A cylinder 53 (FIG. 9c) is connected with the moving part of rotary encoder 41 on a rotational axis 42. Each movement of the measuring probe 46 around the axis 44 and in a measuring plane 47 is transferred via a band 52 from the cylinder 51 to the cylinder 53 and thus to the rotational axis 42 of the rotary encoder 41. Means for the creation of a moment of rotation and/or a measuring force, not illustrated here, can act on the axis 42 of the rotary encoder 41, which can be transferred via the cylinder 53, the band 52, the cylinder 51 and the shank 45 to the measuring probe 46. The housing of the rotary encoder 41 with the arm 43 is fixed to the carriage 6 in a rotatable manner and can be stopped at a pre-determined or at any angle. In a further practical embodiment the angle can be measured with an additional rotary encoder and taken into account in the calculations of the measuring probe 46 coordinates.

FIG. 9b shows the column 3, the carriage 6 and the measuring head in a further practical embodiment from above. The latter is connected with the carriage 6 via a joint 14 with a vertical axis 24, so as to be capable of pivoting in a horizontal plane 48. In a practical embodiment not illustrated here the axis 24 can be positioned horizontally.

If in a more advanced practical embodiment of the vertical/horizontal measuring apparatus in accordance with the invention the rotation of the arm 43 around the rotational axis 42 is measured by a separate rotative measuring system MS4, for instance in the form of a separate rotary encoder, further possibilities for application are opened up for the vertical/horizontal measuring apparatus in accordance with the invention. Here also, similar to the above described practical embodiments of the vertical/horizontal measuring apparatus in accordance with the invention, the rotary encoder 41 can also be connected with the carriage 6 so as to permit linear displacement, whereby this displacement can again take place with or without being measured. The rotation capability of the rotary encoder 41 can be connected with its linear displacement capability. In all of these cases it is advantageous if the computer 26 can collect and evaluate the signals produced by the various measuring systems MS1, MS2, MS3 and MS4 individually and in pre-determined dependence on one another.

Instead of the swivelling joint 14 and 15 illustrated in FIGS. 5, 6 and 9b for unmeasured swivelling of the rotary encoder 7, 41 about the axis 24, in accordance with FIG. 10 a second rotary encoder 16 with a fifth measuring system MS5 can be used with the rotary encoder 7, 41 mounted on its shaft 17 in such a way that its rotational axis 11, 42 is perpendicular to the axis 18 of the second rotary encoder 16. In this practical embodiment of the invention the measuring probe 10 can be movable in a vertical as well as a horizontal measuring plane as well as together with the carriage 6 on the column 3. The vectors of displacement in the same direction are here added together by the computer 26. The projection of the length of the shank 9 must be taken into account as an effective lever arm. Of course instead of the rotary encoder 7 with the measuring system MS2 illustrated in FIG. 10, all of the other practical embodiments of this component described above can be mounted onto the shaft 17 of the second rotary encoder 16. This design extension of the vertical/horizontal measuring apparatus in accordance with the invention permits a whole range of additional measurements of points in space which are not possible with conventional height measuring apparatus.

The measurement of diameters of shafts and bores where the linear displacement capability of the rotary encoder 7, 41 along the linear guide 12, 13 is not sufficient requires a horizontal displacement of the entire vertical/horizontal measuring apparatus along a straight line. This displacement can be achieved by moving the vertical/horizontal measuring apparatus in accordance with the invention in a conventional manner on an air cushion along a rule. However, in accordance with the invention the measuring apparatus is advantageously placed on a base in accordance with FIGS. 11a and 11b which essentially contains a horizontal longitudinal guide 61 and a scale 62. A linear measuring system MS6 which acts together with the scale 62 is advantageously incorporated in the base plate 2 and connected with the computer 26. The longitudinal guide 61 must be free of play and straight since guide errors are reproduced in the measuring result. In accordance with the invention, the provision of the vertical/horizontal measuring apparatus in accordance with FIG. 11 with a longitudinal guide 61 made of ceramic material preferably in connection with a magnet bearing offers optimal conditions. The magnetic force is only required to act in a horizontal direction on the longitudinal guide 61, since the weight of the measuring apparatus acts in the vertical direction. In order to facilitate ease of movement, an air cushion can be provided between the base plate 2 and the surface underneath. If a lesser degree of accuracy is required of the horizontal displacement of the measuring apparatus it is also possible to move it on rollers.

In FIGS. 12a, 12b and 12c a practical embodiment of the vertical/horizontal measuring apparatus in accordance with the invention is shown which, instead of one or more rotative measuring systems MS2, MS6, uses a measuring head 67 which advantageously contains several measuring systems MS7, MS8 and MS9 positioned perpendicular to one another, whereby the measuring probe 10 can be moved in several degrees of freedom. The measuring head 67 is attached to the carriage 6. The travel component of the measuring probe 10 in the direction of displacement of the carriage 6 is here added to the amount of the displacement of the carriage 6 in order to determine the displacement of the measuring probe 10. FIG. 12a shows the column 3 with the scale 4 and the assembly which can be moved along it comprising the carriage 6 and the measuring head 67 in a side view, while FIG. 12b shows the same elements from above. The measuring system MS7 measures the displacement of the shank 9 and the measuring head 10 in the vertical plane, while the measuring system MS9 measures the displacement of the shank 9 and the measuring head 10 in the horizontal plane. The linear displacement of the shank 9 and the measuring probe 10 along the axis of the shank 9 is measured by the measuring system MS8. Naturally, all three measuring systems MS7, MS8 and MS9 are connected with the computer. FIG. 12c illustrates the movements which can be made by the measuring probe 10 and the shank 9 within an X;Y;Z coordinate system.

FIG. 13 illustrates the geometry for measuring a profile, for instance on a grinding wheel. Starting at a reference plane 71 and for instance the axis a—a the angle and position of the conical zone 72, the distance of the flank 73, the deviation from shape and position of the semi-circular zone 74 and finally the radius of the cylinder 75 can be measured. The measurement results are obtained from the determined differences in height $h_1$ to $h_7$ and the corresponding angles $\alpha_1$ to $\alpha_7$. It is also important here that the same measuring apparatus can be used for the measurement of horizontal and vertical distances as well as deviations of shape and position. The object to be measured, represented with its axis a—a in a horizontal position in the drawing, can also be measured with its axis a—a in a vertical position if this seems expedient.

FIG. 14 shows that the computer 26, if appropriate, can be connected by a cable 50 to the measuring systems MS1 to MS9 and be separate from the column 3 and the base plate 2. It forms part of a service block which can, apart from a display, keyboard, power supply and compressed air source include other elements which make the measuring apparatus easier to use or which allow special evaluations of the measured results. In particular it is recommended that a printer and a data storage unit are also included in the service block. This, or alternatively the measuring apparatus itself can advantageously be linked to a computer 28 or peripheral equipment by means of a standard interface.

FIGS. 15a, 15b and 15c illustrate schematically the measurement of angles, in these cases of angles of inclination towards the horizontal reference plane. With the rotational axis 11 of the rotary encoder 7 in position $h_1$, the surface F is approached for scanning by the measuring probe 10 and the angle $\alpha_1$ measured and stored. After moving the axis 11 of the rotary encoder 7 along the line Z into position $H_2$, a second point on the surface F is approached for scanning. The angle of inclination $\Theta$ of the surface F can be calculated from the coordinate values $h_1$ and $h_2$ and the angle values $\alpha_1$ and $\alpha_2$. FIGS. 15a and 15b show different angles of inclination $\Theta$ of the surface F.

FIG. 15c shows schematically the measurement of the angle of inclination of a rectangular block in relation to the horizontal reference plane as well as the determination of the distance a between two of its boundary surfaces by scanning three points. Starting at the position $h_1$ of the axis 11 of the rotary encoder 7 the measuring probe 10 is placed on the lower surface of the block and the value of the angle $\alpha_1$ measured and stored. After moving the rotational axis 11 of the rotary encoder 7 along the axis Z to position $h_2$, the lower surface of the block is approached for scanning a second time and the angle value $\alpha_2$ and height coordinate $h_2$ measured and stored. After moving the rotational axis 11 of the rotary encoder 7 along the axis Z to a height coordinate $h_3$, the measuring probe 10 is placed onto the upper surface of the block and the angle $\alpha_3$ measured. Taking into account the probe constant, the center point radius R of the measuring probe 10 and the direction of approach for scanning, the angle of inclination $\Theta$ and the distance a between the boundary surfaces of the block can be calculated and displayed on the basis of the measured and stored values $\alpha_{1-3}$ and $h_{1-3}$.

FIG. 16 shows how horizontal distances of parallel vertical surfaces on a workpiece can be measured. With the measuring probe 10 placed on the surface $F_1$, the angle $\alpha_1$ is measured and stored. After moving the rotational axis 11 of the rotary encoder 7 along the axis Z, the measuring probe 10 is placed onto the surface $F_2$ and the angle $\alpha_2$ measured, after which the horizontal distance between the surfaces $F_1$ and $F_2$ can be calculated and displayed. After again moving the rotational axis 11 of the rotary encoder 7, the surface $F_3$ is approached for scanning, the angle $\alpha_3$ measured and the distance between the surfaces $F_3$ and $F_1$ calculated and displayed. After again moving the rotational axis 11 of the rotary encoder 7, the surface $F_4$ on the reverse side can finally be approached for scanning, the angle $\alpha_4$ measured and the distance between the surfaces $F_1$ and $F_4$ calculated and displayed. If all measured angles $\alpha_1$ to $\alpha_4$ are stored, the distances between all surfaces $F_1$ to $F_4$ can be calculated and displayed. The coordinates of the rotational axis 11 on the Z axis are irrelevant for this type of measurement and can therefore be ignored.

FIG. 17 shows a procedure for determining the diameter of a bore, the position of its center and deviations in shape from a theoretical circle. In FIG. 17a the measuring process is shown schematically and in FIG. 17b the arrangement of the column 3, carriage 6, rotary encoder 7 with shaft 8 and angled shank 9a attached to it with the measuring probe 10 are shown. With the axis 11 of the rotary encoder 7 in the coordinate position $h_1$, two points on the surface of the bore are approached for scanning and the angles $\alpha_1$ and $\alpha_2$ measured and stored. With the rotational axis 11 of the rotary encoder 7 in coordinate position $h_2$ after displacement along the axis Z, two further points on the surface of the bore are scanned and the angles $\alpha_3$ and $\alpha_4$ measured and stored. The diameter and the position of the bore axis in Z as well as in Y direction can be calculated from the coordinate values $h_1$ and $h_2$ as well as the angles $\alpha_1$ to $\alpha_4$, taking into account the constant of the measuring probe 10 and its center point radius R. Three of the points measured on the surface of the bore define the diameter and the position of the bore center in vertical and horizontal directions. If the rotational axis 11 of the rotary encoder 7 is moved along the axis Z and further points on the bore surface are approached for scanning, the deviation from a theoretical circle defined by three points can be determined. The same procedure can also be applied analogously for the measurement of external diameters.

FIG. 18 illustrates a further procedure for the determination of the diameter and position of the center of a circular bore. An angled shank 9a, as shown in FIGS. 7 and 17b, carries the measuring probe 10. With the rotational axis 11 of the rotary encoder 7 in the position $h_1$, the surface of the bore is approached for scanning at two points so that the angles $\alpha_1$ and $\alpha_2$ can be measured. These two points define a chord of the circular cross section of the bore. After moving the rotational axis 11 of the rotary encoder 7 along the axis Z to the position $h_2$ and scanning a third point on the surface of the bore, the angle $\alpha_3$ is measured, thereby defining two further chords. The diameter of the bore and the position of its axis in Z as well as in Y direction can be calculated from the coordinate values $h_1$ and $h_2$ as well as the angles $\alpha_1$ to $\alpha_3$, taking into account the probe constant of the measuring probe 10 and its center point radius R. The same procedure can also be applied analogously for the measurement of external diameters. However, this procedure requires that the section of the bore or external diameter is circular.

FIGS. 19a and 19b illustrate the measurement of a thread using the vertical/horizontal measuring apparatus in accordance with the invention and with FIG. 10, whereby the first rotary encoder 7 is connected with the shaft 17 of the second rotary encoder 16, which is mounted on the carriage 6 in a corresponding manner to the rotary encoder 7 in FIG. 4, so as to be movable in a linear manner at right angles to the column 3. The measuring probe 10 is first of all placed at the top between two flanks of the thread while the rotary encoder 7 is at height $h_1$ on the column 3. It is then guided over the highest point of the flank diameter by linear displacement of the rotational axis 11 between the positions $Z''$, $Z$ and $Z'$. In addition to the height $h_1$, the angles $\alpha_1$ and $\beta_1$ of the highest point of the flank diameter are determined and stored in the computer. Finally the measuring probe 10 is placed from below into the thread at a height $h_2$ of the rotary encoder 7, after which the lowest point of the flank diameter is measured in analogous manner. In addition to the height $h_2$, the angles $\alpha_2$ and $\beta_2$ are determined and stored in the computer. The flank diameter can be calculated from the angles $\alpha_1$ and $\alpha_2$ by taking into account the probe constant as well as the linear displacement of the carriage 6 between the heights $h_1$ and $h_2$. Since the two measured flank diameter points are by definition offset by 180° to one another, the half pitch of the thread can be calculated from the angles $\beta_1$ and $\beta_2$. For measurement over several pitches, the angle $\beta_3$ is measured.

In a similar way this type of practical embodiment of the vertical/horizontal measuring apparatus in accordance with the invention is also suitable for the measurement of gear wheels. In the same way inner threads and inner tooth constructions can also be measured, whereby it may be necessary to use an angled shank 9a in order to reach the measuring points with the measuring probe 10. Similar measurements are possible with the measuring head 67 in accordance with FIG. 12.

It may be expedient or necessary to shift the measuring apparatus as a whole in a parallel manner along the horizontal reference plane 1 in order to position it suitably in relation to the object to be measured. Known means such as longitudinal guides or pantographs can be provided for this purpose. Spring-loaded friction wheels may also be mounted in the base plate 2 which roll along the reference plane 1, thus guiding the measuring apparatus in at least a roughly parallel manner. The total spring tension of these wheels should be smaller than the weight load of the measuring apparatus so that the base plate rests properly on the reference plane 1. As part of the automation of the measuring procedure, this displacement can be achieved with the aid of a motor.

On the basis of the above-described selective examples of application of the various practical embodiments of the vertical/horizontal measuring apparatus in accordance with the invention, the expert will be able to recognise the further application possibilities which far exceed those of a conventional height measuring apparatus, without any need for them to be described here.

He will also recognise that the measuring system operatively connected with the measuring probe is capable of the following degrees of freedom and types of movement or displacement in relation to the carriage:

translatory displacement in the horizontal plane, either in the X or the Y axis or both pivoting movement in the horizontal or vertical plane or in both around a point of rotation free translatory and rotative movement in the horizontal plane, i.e. floating, if necessary with an air and magnet bearing pivoting movement around a point of rotation and translatory displacement in one or more axes.

The expert will recognise that the vertical/horizontal measuring apparatus in accordance with the invention belongs to a completely new generation of measuring apparatus. It is self-evident that individual components of the practical embodiments of the vertical/horizontal measuring apparatus in accordance with the invention described can be constructed differently in detail to the examples shown in the drawings or described in the above. In addition, further practical embodiments of the vertical/horizontal measuring apparatus in accordance with the invention can be constructed, for instance containing several operatively interconnected rotary encoders and/or linear transducers. For the invention it is immaterial whether only linear or only one linear measuring system in the form of the carriage on the column and one or more measuring systems comprising linear transducers and/or rotary encoders are used. However, the expert will realise that the use of at least one rotary encoder as a measuring system has considerable advantages.

I claim:

1. Vertical/horizontal measuring apparatus, comprising at least one column (3) with carriage (6) which can be moved along it in a linear manner, whereby the column (3) is provided with a material measure and the carriage (6) contains a first measuring system (MS1) for measuring values with which the position of the carriage (6) on the column (3) can be determined and whereby the carriage (6) is operatively connected with a second measuring system (MS2) for measuring values attached to it, containing a measuring probe (10) whose position in relation to the carriage (6) can be determined by means of the second measuring system (MS2), characterized in that the column 3 is made of ceramic material and the direction of measurement of the second measuring system (MS2) can be fixed at least in the direction of measurement of the first measuring system (MS1) and that a computer (26) combines the measured values from both measuring systems (MS1, MS2), taking into account the direction of measurement, by means of pre-determined mathematical operations in order to calculate the distance of the measuring probe (10) from a reference plane (1).

2. Vertical/horizontal measuring apparatus, comprising at least one column (3) with carriage (6) which can be moved along it in a linear manner, whereby the column (3) is provided with a material measure and the carriage (6) contains a first measuring system (MS1) for measuring values with which the position of the carriage (6) on the column (3) can be determined and whereby the carriage (6) is operatively connected with a second measuring system for measuring values attached to it, containing a measuring probe (10) whose position in relation to the carriage (6) can be determined by means of the second measuring system, characterized in that the second measuring system comprises two of three measuring systems (MS7, MS8, MS9) and the measuring probe (10) is movable in two or three degrees of freedom and is connected with a linear measuring head (67) attached to the carriage (6) and provided with two or three linear measuring systems (MS7, MS8, MS9) arranged at right angles to one another and (FIG. 12) that a computer (26) combines the measured values from the measuring systems (MS1, MS7, MS8, MS9), taking into account the directions of measurements, by means of pre-determined mathematical operations in order to calculate the distances of the measuring probe (10) from a reference plane (1).

3. Measuring apparatus in accordance with claim 2, characterized in that one degree of freedom has the same direction as the direction of displacement of the carriage (6). (FIG. 12)

4. Measuring apparatus in accordance with claim 2, characterized in that the measuring head (67) is pivotable or movable perpendicular to the direction of displacement of the carriage (6). (FIG. 12)

5. Vertical/horizontal measuring apparatus, comprising at least one column (3) with carriage (6) which can be moved along it in a linear manner, whereby the column (3) is provided with a material measure and the carriage (6) contains a first measuring system (MS1) for measuring values with which the position of the carriage (6) on the column (3) can be determined and whereby the carriage (6) is operatively connected with a second measuring system (MS2) for measuring values attached to it, containing a measuring probe (10) whose position in relation to the carriage (6) can be determined by means of the second measuring system (MS2), characterized in that the measuring probe (10) is connected via a shank (9) with a rotary encoder (7) which contains the rotative second measuring system (MS2) and is operatively connected with the carriage (6) and in that the direction of measurement of the second measuring system (MS2) can be fixed at least in the direction of measurement of the first measuring system (MS1) and that a computer (26) combines the measured values from both measuring systems (MS1, MS2), taking into account the direction of measurement, by means of pre-determined mathematical operations in order to calculate the distance of the measuring probe (10) from a reference plane (1).

6. Measuring apparatus in accordance with claim 5, characterized in that the rotational axis (11) of the rotary encoder (7) is at right angles or parallel to the direction of displacement of the carriage (6) on the column (3). (FIGS. 1 and 2)

7. Measuring apparatus in accordance with claim 5, characterized in that the measuring probe (10) is fixed to a shank (45) mounted so as to be rotatable on an arm (43), which is operatively connected with the rotary encoder (41), and that each rotation of the measuring probe (46) is transferred by means of a transfer mechanism (51, 52, 53) to the rotary encoder (41). (FIG. 9)

8. Measuring apparatus in accordance with claim 5 characterized in that the rotary encoder (7) is fitted on the shaft (17) of a second rotary encoder (16) with a measuring system (MS5) for the measurement of its rotation about the rotational axis (18). (FIG. 10)

9. Measuring apparatus in accordance with claim 8, characterized in that the second rotary encoder (16) is pivotable perpendicular to its rotational axis (18).

10. Measuring apparatus in accordance with claim 5, characterized in that the one or more rotary encoders (7, 16) is or are capable of linear displacement of right angles to the direction of displacement of the carriage (6).

11. Measuring apparatus in accordance with claim 10, characterized in that the linear displacement can be measured by a third measuring system (MS3) connected with the computer (26).

12. Measuring apparatus in accordance with claim 5, characterized in that the rotary encoder (7 or 16) is pivotable in a plane vertical to its measuring plane (21, 22) about a rotational axis (24, 25).

13. Measuring apparatus in accordance with claim 5, characterized in that the measuring probe (10) is connected with the rotary encoder (7) via an angled shank (9a). (FIG. 7)

14. Measuring apparatus in accordance with claim 5, characterized in that it can be operatively connected with a longitudinal guide (61) in such a way that it can be moved parallel to a reference plane (1) along a straight line. (FIG. 11)

15. Measuring apparatus in accordance with claim 14, characterized in that the displacement can be measured by a measuring system (MS6).

16. Measuring apparatus in accordance with claim 2 or 5, characterized in that the carriage (6), the rotary encoder (7, 16) and/or the linear measuring head (67) as well as, if necessary, the base plate (2) in the longitudinal guide (61) can be controlled by the computer (26).

17. Measuring apparatus in accordance with claim 2 or 5, characterized in that the computer (26) records the signals from each measuring system (MS1, MS2, MS7, MS8, MS9) individually and processes them in accordance with pre-determined criteria, constants and variables, displays them and combines the computed results according to pre-determined criteria.

18. Measuring apparatus in accordance with claim 2 or 5, characterized in that the measuring force of the measuring head (67) or the rotary encoder (7, 16) is adjustable by motor in accordance with pre-determined criteria.

19. Measuring apparatus in accordance with claim 2 or 5, characterized in that the measuring system (MS2) operatively connected with the measuring probe (10) is freely movable on one plane.

20. Measuring apparatus in accordance with claim 2 or 5, characterized in that the column (3) is made of ceramic material.

21. Measuring apparatus in accordance with claim 1, characterized in that the column (3) is the substrate for a material measure.

22. Measuring apparatus in accordance with claim 21, characterized in that the carriage (6) can be positioned on the column (3) by means of at least one magnet bearing.

23. Measuring apparatus in accordance with claim 1, characterized in that the column possesses points of support in such a way that the measuring apparatus can be used with the column (3) in a vertical as well as a horizontal position. (FIGS. 1, 8)

24. Procedure for the use of a vertical/horizontal measuring apparatus in accordance with claim 1, characterized in that the component of the measured value of the second measuring system (MS2) in the direction of measurement of the first measuring system (MS1) is added to the measured value of the first measuring system (MS1).

25. Procedure for the use of a vertical/horizontal measuring apparatus in accordance with claim 24, characterized in that measuring systems (MS1, MS2) act in directions at right angles to one another.

26. Procedure for the use of a vertical/horizontal measuring apparatus in accordance with claim 24, characterized in that the measured values of measuring systems (MS1, MS2) are used for the calculation of two-dimensional coordinates in one plane.

27. Procedure in accordance with claim 24, characterized in that the measured values of the measuring systems (MS1, MS2) are displayed and/or recorded as soon as the sum of the measured values of the measuring systems (MS1, MS2) is constant within a pre-determined tolerance or over a pre-determined length of time, although the individual values of both measuring systems continue to change, or when the values of both variations are equal and with opposite signs or when a pre-determined measuring force of momentum is reached.

* * * * *